US012341366B2

(12) United States Patent
Zhang

(10) Patent No.: US 12,341,366 B2
(45) Date of Patent: Jun. 24, 2025

(54) INTELLIGENT CHARGING PILE FOR ROBOT

(71) Applicant: CLOUDMINDS ROBOTICS CO., LTD., Shanghai (CN)

(72) Inventor: Navy Zhang, Shanghai (CN)

(73) Assignee: CLOUDMINDS ROBOTICS CO., LTD., Shanghai (CN)

( * ) Notice: Subject to any disclaimer, the term of this patent is extended or adjusted under 35 U.S.C. 154(b) by 682 days.

(21) Appl. No.: 17/562,816

(22) Filed: Dec. 27, 2021

(65) Prior Publication Data

US 2022/0126720 A1 Apr. 28, 2022

Related U.S. Application Data

(63) Continuation of application No. PCT/CN2021/119703, filed on Sep. 22, 2021.

(30) Foreign Application Priority Data

Sep. 28, 2020 (CN) .......................... 202011043121.6

(51) Int. Cl.
*H02J 7/00* (2006.01)
*B60L 53/126* (2019.01)
*B60L 53/62* (2019.01)

(52) U.S. Cl.
CPC .......... *H02J 7/0029* (2013.01); *B60L 53/126* (2019.02); *B60L 53/62* (2019.02); *H02J 7/00036* (2020.01); *H02J 7/0048* (2020.01); *H02J 7/005* (2020.01)

(58) Field of Classification Search
CPC .................................................. H02J 7/0029
(Continued)

(56) References Cited

U.S. PATENT DOCUMENTS 5,587,924 A * 12/1996 Rossi .................. H02J 7/00038
340/636.15
6,764,373 B1 * 7/2004 Osawa .................... A63H 11/20
446/454

(Continued)

FOREIGN PATENT DOCUMENTS

CN 101976731 A 2/2011
CN 105743197 A 7/2016

(Continued)

OTHER PUBLICATIONS

European Search Report issued in corresponding application No. 21827570.9, dated Sep. 19, 2022.

(Continued)

*Primary Examiner* — Jerry D Robbins
(74) *Attorney, Agent, or Firm* — Maschoff Brennan

(57) ABSTRACT

Some embodiments of the present disclosure provide an intelligent charging pile for a robot, includes: a charging loop, a protecting loop, and a communication control loop; the charging loop is connected with the protecting loop; the protecting loop is connected with the communication control loop; the communication control loop controls the charging loop to be turned off by means of controlling the protecting loop to be turned off, the communication control loop is connected with the charging loop; the communication control loop is further used for acquiring battery information data of the robot and sending, according to the battery information data, an adjustment instruction to the charging loop; and the charging loop is used for adjusting, according to the adjustment instruction, an own charging parameter and charging, according to the adjusted charging parameter, the robot.

9 Claims, 2 Drawing Sheets

(58) Field of Classification Search
USPC .......................................................... 320/109
See application file for complete search history.

(56) References Cited

U.S. PATENT DOCUMENTS

| | | | | |
|---|---|---|---|---|
| 11,537,439 B1* | 12/2022 | Liberty | ................ | G06F 9/5077 |
| 2002/0109485 A1* | 8/2002 | Wu | ...................... | H02J 7/0034 |
| | | | | 320/157 |
| 2005/0221840 A1* | 10/2005 | Yamamoto | .......... | G05D 1/0225 |
| | | | | 455/456.3 |
| 2006/0043929 A1* | 3/2006 | Koyanagi | ......... | H01R 13/6315 |
| | | | | 320/114 |
| 2008/0218125 A1* | 9/2008 | Bansal | ................ | H02J 7/0069 |
| | | | | 320/132 |
| 2008/0218126 A1* | 9/2008 | Bansal | ................ | H02J 7/0069 |
| | | | | 320/132 |
| 2009/0008368 A1* | 1/2009 | Beeson | ............ | H02J 7/007182 |
| | | | | 219/130.33 |
| 2011/0089891 A1* | 4/2011 | Pai | ...................... | H02J 7/0044 |
| | | | | 320/115 |
| 2013/0076304 A1* | 3/2013 | Andersson | ........... | H02J 7/0042 |
| | | | | 320/107 |
| 2013/0308239 A1* | 11/2013 | Yamada | ................ | H02J 7/0029 |
| | | | | 361/93.1 |
| 2016/0374526 A1* | 12/2016 | Yang | .................... | A47L 9/2857 |
| | | | | 701/23 |
| 2019/0052101 A1* | 2/2019 | Xiong | .................. | H02J 7/0013 |
| 2019/0092183 A1* | 3/2019 | Sussman | ............. | G05D 1/0088 |
| 2019/0217737 A1* | 7/2019 | Lotfy | .................... | G06Q 10/02 |
| 2019/0222043 A1* | 7/2019 | Jiao | ........................ | B25J 5/007 |
| 2019/0358428 A1* | 11/2019 | Wang | .................... | H04L 9/3239 |
| 2019/0369625 A1* | 12/2019 | Chen | ...................... | B60L 53/53 |
| 2020/0174078 A1* | 6/2020 | Salo, III | ............... | G07C 5/0841 |
| 2020/0249688 A1* | 8/2020 | Caussy | ............... | H02J 7/00034 |
| 2020/0359868 A1* | 11/2020 | Bo | ........................ | A47L 9/1683 |
| 2022/0063139 A1 | 3/2022 | Mori | | |
| 2023/0070517 A1* | 3/2023 | Sharma | ............... | G06F 11/3684 |
| 2023/0182597 A1* | 6/2023 | Tsai | ...................... | A47L 9/2873 |
| | | | | 320/107 |
| 2024/0106262 A1* | 3/2024 | Kim | ....................... | H02J 9/061 |
| 2024/0126265 A1* | 4/2024 | Ebrahimi Afrouzi | | ........................ |
| | | | | A47L 9/0477 |
| 2024/0429730 A1* | 12/2024 | Abbott | ................. | H01M 10/46 |

FOREIGN PATENT DOCUMENTS

| | | |
|---|---|---|
| CN | 111332141 A | 6/2020 |
| CN | 111448737 A | 7/2020 |
| CN | 112186850 A | 1/2021 |
| EP | 1 921 523 A2 | 5/2008 |

OTHER PUBLICATIONS

CN Office Action in Application No. 202011043121.6 Dated May 16, 2022.
PCT International Search Report in Application No. PCT/CN2021/119703 Dated Oct. 29, 2021.

* cited by examiner

INTELLIGENT CHARGING PILE FOR ROBOT

CROSS-REFERENCE TO RELATED APPLICATIONS

The present disclosure is a continuation of International Application No. PCT/CN2021/119703, filed on Sep. 22, 2021, the disclosure of which is hereby incorporated by reference in its entirety.

FIELD

The present disclosure relates to the technical field of charging, and more particularly to an intelligent charging pile for a robot.

BACKGROUND

At present, robots develop extremely rapidly, and their functions are increasing day by day. However, there is often a problem of low battery occurring in robots when they are working. Manual operations are required to help the robots to continue to work. This restrains the robots when they are working, and also increases the labor cost. In order to improve the working efficiency of robots and reduce the labor cost, research on auto-charging of robots has become a major direction of current robot development. Existing robots mainly carry out automatic charging through charging piles.

The inventor finds that the existing art at least has the following problems: 1. after the charging pile is connected with a power supply, there is a charging voltage output, and the output is unsafe and easily causes a short loop and electric shock; 2. one charging pile is equipped with one robot, and there is no intelligent charging pile that may satisfy different types of robots. Since the types of batteries of different robots are different, the charging piles for the robots must be replaced frequently, which causes a lot of waste on cost and technology.

SUMMARY

Some embodiments of the present disclosure aim to provide an intelligent charging pile for a robot, which has high safety and high reliability and may adapt to robots with various battery types.

An embodiment of the present disclosure provides an intelligent charging pile for a robot, including a charging loop, a protecting loop, and a communication control loop; the charging loop is connected with the protecting loop; the protecting loop is connected with the communication control loop; the communication control loop controls the charging loop to be turned off by means of controlling the protecting loop to be turned off; the communication control loop is connected with the charging loop; the communication control loop is further used for acquiring battery information data of the robot and sending, according to the battery information data, an adjustment instruction to the charging loop; and the charging loop is used for adjusting, according to the adjustment instruction, a self charging parameter and charging, according to the adjusted charging parameter, the robot.

Compared to the existing art, the embodiment of the present disclosure has the advantages that by means of arranging the charging loop, the protecting loop, and the communication control loop. On the one hand, the protecting loop is connected with the communication control loop and the charging loop, respectively. Since the communication control loop may control the charging loop to be turned off by means of controlling the protecting loop to be turned off, the protecting loop may be controlled to be turned off after the charging pile is connected with a power supply, so as to turn off the charging loop, and the protecting loop is controlled to be turned on when it is necessary to charge the robot. Therefore, the phenomenon of "after the charging pile is connected with a power supply, there is a charging voltage output, and the output is unsafe and easily causes a short loop and electric shock" is avoided, and the safety and reliability of the intelligent charging pile of the robot are improved. On the other hand, the communication control loop will further acquire the battery information data of the robot, and the charging loop may adjust, according to the adjustment instruction sent by the communication control loop, the self charging parameter and then charge, according to the adjusted charging parameter, the robot, so that the intelligent charging pile for the robot may adapt to robots with various battery types.

BRIEF DESCRIPTION OF THE DRAWINGS

One or more embodiments are exemplified by the corresponding accompanying drawings. These exemplified descriptions do not constitute a limitation to the embodiments. Elements with the same reference numerals in the accompanying drawings are shown as similar elements. The drawings in the accompanying drawings do not constitute scaling restrictions unless otherwise stated.

DETAILED DESCRIPTION OF EXAMPLE EMBODIMENTS

In order to make the objectives, technical solutions, and advantages of the present disclosure clearer, part of the embodiments of the present disclosure is further described below in detail with reference to accompanying drawings and embodiments. Those of ordinary skill in the art can understand that in the various embodiments, many technical details are presented in order to make the present disclosure better understood by readers. However, the technical solutions claimed in the present disclosure can also be implemented without these technical details and various changes and modifications based on the embodiments. All the following embodiments are divided for the convenience of description and shall not constitute any restriction on the specific implementation modes of the present disclosure. All the embodiments can be combined and referenced with each other with no conflicts.

Figure 1:
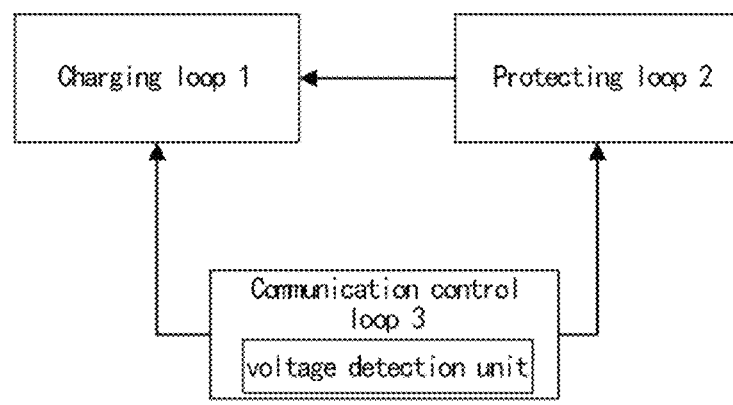
FIG. 1 is a schematic structural diagram of an intelligent charging pile for a robot according to a first embodiment of the present disclosure.

The first embodiment of the present disclosure relates to an intelligent charging pile 100 for a robot, specific structure being as shown in FIG. 1, including:

a charging loop 1, a protecting loop 2, and a communication control loop 3. The charging loop 1 is connected with the protecting loop 2; the protecting loop 2 is connected with the communication control loop 3; the communication control loop 3 controls the charging loop 1 to be turned off by means of controlling the protecting loop 2 to be turned off; the communication control loop 3 is connected with the charging loop 1; the communication control loop 3 is further used for acquiring battery information data of the robot and sending, according to the battery information data, an adjustment instruction to the charging loop 1; and the charging loop 1 is used for adjusting, according to the adjustment instruction, a self charging parameter and charging, according to the adjusted charging parameter, the robot.

Compared to the existing art, the embodiment of the present disclosure has the advantages that by means of arranging the charging loop 1, the protecting loop 2, and the communication control loop 3. On the one hand, the protecting loop 2 is connected with the communication control loop 3 and the charging loop 1, respectively. Since the communication control loop 3 may control the charging loop 1 to be turned off by means of controlling the protecting loop 2 to be turned off, the protecting loop 2 may be controlled to be turned off after the charging pile is connected with a power supply, so as to turn off the charging loop 1, and the protecting loop 2 is controlled to be turned on when it is necessary to charge the robot. Therefore, the phenomenon of "after the charging pile is connected with a power supply, there is a charging voltage output, and the output is unsafe and easily causes a short loop and electric shock" is avoided, and the safety and reliability of the intelligent charging pile 100 of a robot are improved. On the other hand, the communication control loop 3 will further acquire the battery information data of the robot, and the charging loop 1 may adjust, according to the adjustment instruction sent by the communication control loop 3, the self charging parameter and then charge, according to the adjusted charging parameter, the robot, so that the intelligent charging pile 100 for a robot can adapt to robots with various battery types.

Figure 2:
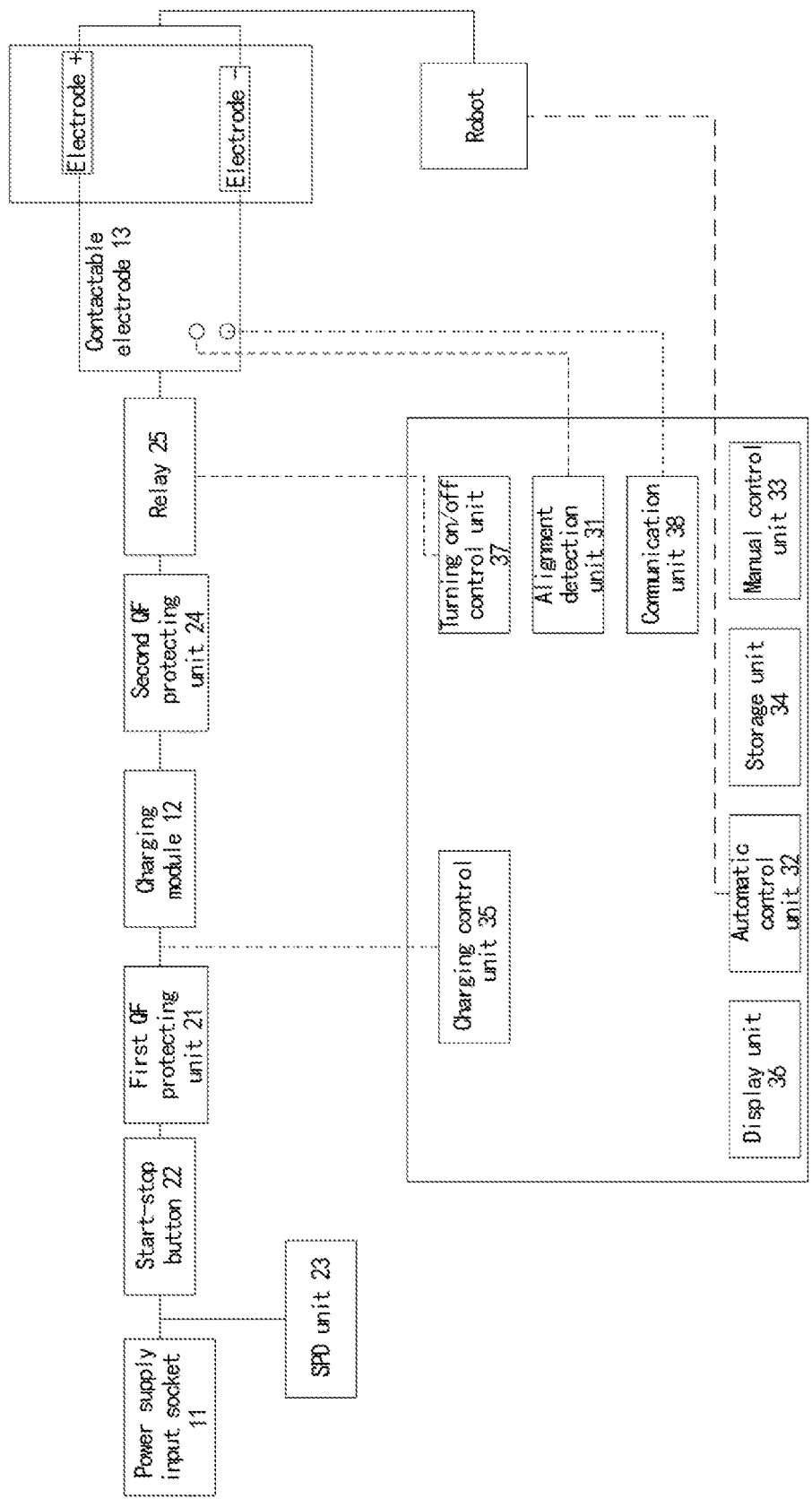
FIG. 2 is another schematic structural diagram of an intelligent charging pile for a robot according to a first embodiment of the present disclosure.

Referring to FIG. 2, the charging loop 1 in the present embodiment includes a power supply input socket 11, a charging module 12, and a contactable electrode 13; the power supply input socket 11 is connected with a mains supply and is used for introducing an input power supply; the charging module 12 is connected with the communication control loop 3 and is used for adjusting, according to the adjustment instruction, the self charging parameter; and the contactable electrode 13 is connected with the robot and is used for charging, according to the adjusted charging parameter, the robot. Specifically, the power supply input socket 11 is an alternating current power supply input socket; an alternating current/direct current (AC/DC) converter and a DC/DC converter are arranged in the charging module 12; the AC/DC converter is used for converting an AC into a DC; and the DC/DC converter is used for converting a DC into a DC power supply.

It is worth mentioning that a sensor (not shown) is arranged in the contactable electrode 13; the sensor is used for detecting whether contact between the charging pile and the robot meets a preset requirement; and the communication control loop 3 is connected with the sensor and is used for enabling, when the sensor detects that the contact between the charging pile and the robot meets the preset requirement, a self detection program. Specifically, the sensor detects whether the charging pile and the robot are in good contact (after the robot contacts the charging pile, the sensor determines, according to an electric signal of contact, whether the charging pile and the robot are in good contact); and after the charging pile and the robot are in good contact, the communication control loop is enabled for next detection.

Preferably, the communication control loop 3 includes an alignment detection unit 31; the alignment detection unit 31 is connected with the contactable electrode 13; the alignment detection unit 31 is used for detecting, when the sensor detects that the contact between the charging pile and the robot meets the preset requirement, whether the robot has been aligned with the charging pile; and the communication control loop 3 is used for controlling, after it is detected that the robot has been aligned with the charging pile, the protecting loop 2 to be turned on, so as to enable the contactable electrode 13 to charge the robot. Specifically, the alignment detection unit 31 has the following two ways to detect whether the robot has been aligned with the charging pile: 1, if it is detected mechanically that the robot and the charging pile contact in place, the sensor will feed back a signal to the alignment detection unit 31, so that whether the robot has been aligned with the charging pile is determined by means of determining whether the feedback signal is received; 2, if the robot has been aligned with the charging pile, the alignment detection unit 31 will receive communication data of the robot, so that whether the robot has been aligned with the charging pile is determined by means of determining whether the communication data is received. In this way, the robot may be charged after it is ensured that the robot and the charging pile satisfy a charging condition, thereby further improving the safety and reliability of the intelligent charging pile 100 for a robot.

More preferably, the communication control loop 3 includes an automatic control unit 32; the automatic control unit 32 is used for detecting whether the robot establishes a communication connection with the charging pile and acquiring, after detecting that the robot establishes a communication connection with the charging pile, the battery information data sent by the robot. That is to say, for a robot with communication and interaction functions, the intelligent charging pile 100 for a robot is provided with the automatic control unit 32 to establish the communication connection with the robot, so that the robot may directly sends the self battery information data to the intelligent charging pile 100 for a robot to enable the charging loop 1 to adjust the self charging parameter till the charging parameter is matched with the battery information data of the robot, which ensures that the robot can be charged.

It can be understood that there are also some robots that do not have the communication and interaction functions at present. For the above-mentioned robots, the communication control loop 3 of the intelligent charging pile 100 for a robot of the present embodiment further includes a manual control unit 33 and a storage unit 34; the storage unit 34 stores the battery information data of various kinds of robots; the manual control unit 33 is used for detecting whether the battery information data in the storage unit 34 is called and taking, when detecting that the battery information data in the storage unit 34 is called, the called battery information data as the battery information data of the robot. Specifically, the way used by the manual control unit 33 of the present embodiment for detecting whether the battery information data in the storage unit 34 is called may be: a plurality of buttons are set on the intelligent charging pile 100 for a robot; different buttons correspond to different battery information data; when a robot without the communication and interaction functions needs to be charged, the battery information data of this robot may be manually checked, and the button corresponding to the battery information data is pressed, which indicates that the battery information data is called.

It is worth mentioning that in order to further improve the safety and reliability of the intelligent charging pile 100 for a robot, the communication control loop 3 in the present embodiment further includes a charging control unit 35; the charging control unit 35 is used for making a logic determination on the battery information data and sending, after the logic determination shows no error, the adjustment instruction to the charging loop 1. Specifically, after the logic determination shows no error, the communication control loop 3 adjusts the charging parameter of the charging module 12 by means of the adjustment instruction and pulse width modulation (PWM) adjustment. When the charging parameter is matched with a battery of the robot, the robot is charged. When the charging parameter does not satisfy operating conditions of the robot, information is reported to a background in time, and the output is cut off Since the battery information data sent by the robot or the called battery information data in the storage unit may have a logic error (for example, the battery type does not match the battery parameter, and the charging module 12 fails in adjusting the charging parameter to be matched with the battery information data sent by the robot), the safety and reliability of the intelligent charging pile 100 for a robot may be further improved by the above-mentioned detection way.

It should be noted that the battery information data in the present embodiment includes at least one of a battery type, a battery parameter, and a state of health of the battery. Specifically, in the present embodiment, the battery type may be manually or automatically obtained according to different types of robot batteries, so that an output voltage, a charging current, and a charging curve of the charging pile are adjusted according to the battery type. When the charging pile is applied to a robot a different battery capacity, the charging pile automatically receives the battery information data from the robot and fits and determines the size of the battery capacity in real time. A control curve may be internally programmed according to an input condition, and an appropriate charging curve and power curve are output to meet the charging requirements of different robots.

In the present embodiment, the communication control loop 3 further includes a display unit 36. The display unit 36 is in communication connection with the robot and is used for displaying a state of charge of the robot. Specifically, the display unit 36 includes a three-color lamp strip. Three colors, i.e., blue, green and red, are respectively shown in a charging pile handshaking state (i.e. successful connection to the robot), a charging state (a robot being charged), and a fully charged state (the robot has been fully charged) to remind operations of background staff.

Specifically, the communication control loop 3 further includes a voltage detection unit (not shown); the voltage detection unit is connected with the robot and is used for detecting a charging voltage of the robot; the charging control unit 35 is further used for controlling, when the voltage detection unit detects that the charging voltage is not within a preset voltage range, the protecting loop 2 to be turned off, so as to cause the charging loop 1 to stop charging the robot. In this way, the safety and reliability of the intelligent charging pile 100 for a robot are further improved.

More specifically, as shown in FIG. 2, the protecting loop 2 includes a first QF (Q is for "Switching device for power circuit" and F is for "F: Protection device" under International Electrotechnical Commission (IEC) 61636-1) protecting unit 21, a start-stop button 22, a SPD (Surge Protection Device) unit 23, a second QF protecting unit 24, and a relay 25; the first QF protecting unit 21 is arranged between the start-stop button 22 and the charging module 12; the start-stop button 22 is arranged between the power supply input socket 11 and the first QF protecting unit 21; the SPD unit 23 is grounded and is connected with the power supply input socket 11 and the start-stop button 22 respectively; the second QF protecting unit 24 is arranged between the charging module 12 and the relay 25; the relay 25 is connected with the contactable electrode 13; and the communication control loop 3 further includes an turning on/turning off control unit 37 and a communication unit 38. For the ease of understanding, how the intelligent charging pile 100 for a robot of the present embodiment charges the robot is specifically described below:

1. After the power supply input socket 11 is connected to a mains supply, when there are a peak and a pulse generated, the SPD unit 23 is turned on to cause the power supply input socket 11 to be directly grounded, so a current will not flow into the start-stop button 22.
2. After the charging pile is started through the start-stop button 22, energy flows into the charging module 12 after passing through the first QF protecting unit 21. After the energy is converted by the AC/DC converter and the DC/DC converter, the charging module 12 outputs it to the contactable electrode 13 via the second QF protecting unit 24 and the relay 25.
3. The contactable electrode 13 detects, through the built-in sensor, whether the charging pile and the robot are in good contact. If the hardware contact is good, the communication control loop 3 is informed through the communication unit 38, and at this time, the communication control loop 3 is enabled.
4. The communication control loop 3 firstly detects an alignment interface loop of the contactable electrode 13; after the alignment is completed, the charging pile control unit 35 performs logic operation processing according to a given extent; when there is no detection error and the charging loop 1 and the protecting loop 2 have no fault, the on-off control unit 37 sends a control instruction to the relay 25 for powering on and guides the charging loop 1 to work; when the detection unit detects an extremely low or high output voltage or current or an undervoltage, the charging control unit 35 sends an instruction and timely determines an output of the charging pile; and in case of a short loop or an overload, the first QF protecting unit and the second QF protecting unit act in time to protect the electrical safety of the whole charging pile.
5. The communication control loop 3 has a manual mode and an automatic mode. Under the manual mode condition, voltage and current characteristic curves of several different types of batteries are firstly set, such as LPF1, LPF2, ternary 1, and ternary 2. Engineers manually dial a charging switch according to the requirement of a battery of a robot to meet the charging requirement of the robot.
6. Under the automatic mode, after the robot and the charging pile are in correct hardware alignment, the automatic control unit 32 transmits information; the robot and the charging pile handshake through a given protocol; if a communication protocol is satisfied and the handshaking succeeds, the intelligent charging pile 100 receives the battery information data sent by the robot, including the battery type, the battery parameter, and the state of health of the battery; after the charging pile receives the information, the charging control unit performs logic determination; after the logic determination shows no error, an output curve and the charging parameter of the charging module 12 are adjusted through the adjustment instruction and the PWM adjustment way; when the charging curve meets a need of the battery, the robot is charged; and when the charging curve does not satisfy the operating conditions of the robot, information is reported to the background in time, and the output is cut off.

It should be noted that all the above examples in the present embodiment are illustrations for the ease of understanding, and do not constitute limitations to the technical solutions of the present disclosure.

Those of ordinary skill in the art can understand that the above-mentioned implementation modes are specific embodiments for realizing the present disclosure, and in actual applications, various changes can be made in form and details without departing from the spirit and scope of the present disclosure.

What is claimed is:

1. An intelligent charging pile for a robot, comprising: a charging circuitry, a protecting circuitry, and a communication control circuitry; wherein,
the charging circuitry is connected with the protecting circuitry, the protecting circuitry is connected with the communication control circuitry, and the communication control circuitry controls the charging circuitry to be turned off by means of controlling the protecting circuitry to be turned off, and the communication control circuitry is connected with the charging circuitry, and the communication control circuitry is further used for acquiring battery information data of the robot and sending, according to the battery information data, an adjustment instruction to the charging circuitry; and
the charging circuitry is used for adjusting, according to the adjustment instruction, a self charging parameter and charging, according to the adjusted charging parameter, the robot;
wherein the communication control circuitry comprises: a manual control unit and a storage unit, and the storage unit stores the battery information data of various kinds of robots; and
the manual control unit is used for detecting whether the battery information data in the storage unit is called and taking, when detecting that the battery information data in the storage unit is called, the called battery information data as the battery information data of the robot.

2. The intelligent charging pile for the robot according to claim 1, wherein the charging circuitry comprises: a power supply input socket, a charging module, and a contactable electrode; wherein,
the power supply input socket is connected with a mains supply and is used for introducing an input power supply;
the charging module is connected with the communication control circuitry and is used for adjusting, according to the adjustment instruction, the self charging parameter; and
the contactable electrode is connected with the robot and is used for charging, according to the adjusted charging parameter, the robot.

3. The intelligent charging pile for the robot according to claim 2, wherein a sensor is arranged in the contactable electrode, and the sensor is used for detecting whether contact between the charging pile and the robot meets a preset requirement; and
the communication control circuitry is connected with the sensor and is used for enabling, when the sensor detects that the contact between the charging pile and the robot meets the preset requirement, a self detection program.

4. The intelligent charging pile for the robot according to claim 3, wherein the communication control circuitry comprises: an alignment detection unit, the alignment detection unit is connected with the contactable electrode, and the alignment detection unit is used for detecting, when the sensor detects that the contact between the charging pile and the robot meets the preset requirement, whether the robot has been aligned with the charging pile; and
the communication control circuitry is used for controlling, after it is detected that the robot has been aligned with the charging pile, the protecting circuitry to be turned on, so as to enable the contactable electrode to charge the robot.

5. The intelligent charging pile for the robot according to claim 1, wherein the communication control circuitry comprises: an automatic control unit, and the automatic control unit is used for detecting whether the robot establishes a communication connection with the charging pile and acquiring, after detecting that the robot establishes a communication connection with the charging pile, the battery information data sent by the robot.

6. The intelligent charging pile for the robot according to claim 1, wherein the communication control circuitry further comprises: a charging control unit, and the charging control unit is used for making a logic determination on the battery information data and sending, after the logic determination shows no error, the adjustment instruction to the charging circuitry.

7. The intelligent charging pile for the robot according to claim 1, wherein the communication control circuitry further comprises: a voltage detection unit, and the voltage detection unit is connected with the robot and is used for detecting a charging voltage of the robot;
the charging control unit is further used for controlling, when the voltage detection unit detects that the charging voltage is not within a preset voltage range, the protecting circuitry to be turned off, so as to cause the charging circuitry to stop charging the robot.

8. The intelligent charging pile for the robot according to claim 1, wherein the communication control circuitry further comprises: a display unit, and the display unit is in communication connection with the robot and is used for displaying a state of charge of the robot.

9. The intelligent charging pile for the robot according to claim 1, wherein the battery information data comprises at least one of: a battery type, a battery parameter, and a state of health of the battery.

* * * * *